(12) United States Patent
Hiron

(10) Patent No.: US 9,259,116 B2
(45) Date of Patent: Feb. 16, 2016

(54) STOVE TOP DEVICE FOR MAKING ESPRESSO COFFEE

(75) Inventor: Craig Hiron, Roseville (AU)

(73) Assignee: Otto IP PTY Ltd., Roseville (AU)

(*) Notice: Subject to any disclaimer, the term of this patent is extended or adjusted under 35 U.S.C. 154(b) by 949 days.

(21) Appl. No.: 12/744,319

(22) PCT Filed: Nov. 14, 2008

(86) PCT No.: PCT/AU2008/001701
§ 371 (c)(1),
(2), (4) Date: Aug. 22, 2010

(87) PCT Pub. No.: WO2009/065166
PCT Pub. Date: May 28, 2009

(65) Prior Publication Data
US 2011/0036243 A1    Feb. 17, 2011

(30) Foreign Application Priority Data

Nov. 23, 2007  (AU) ................................. 2007906437
Feb. 26, 2008  (AU) ................................. 2008900921

(51) Int. Cl.
*A47J 31/40*     (2006.01)
*A47J 31/44*     (2006.01)
(Continued)

(52) U.S. Cl.
CPC ............ *A47J 31/303* (2013.01); *A47J 31/0663* (2013.01); *A47J 31/4464* (2013.01); *A47J 31/4485* (2013.01); *A47J 31/52* (2013.01)

(58) Field of Classification Search
CPC ....... A47J 31/56; A47J 31/401; A47J 31/005; A47J 31/52; A47J 31/4485; A47J 31/057; A47J 31/0663; A47J 31/0573; A47J 31/02; A47J 31/54; A47J 31/007; A47G 19/16; B65D 85/8043

USPC ........ 99/283, 323, 323.3, 279, 280, 293, 295, 99/300, 302 R, 307, 316, 299, 305, 309
See application file for complete search history.

(56) References Cited

U.S. PATENT DOCUMENTS 2,549,132 A * 4/1951 Robbiati ......................... 99/307
5,168,794 A * 12/1992 Glucksman ..................... 99/295
(Continued)

FOREIGN PATENT DOCUMENTS

| EP | 0880927 A | 12/1998 |
|---|---|---|
| FR | 2742646 A | 6/1997 |
| WO | WO 2008/128609 A | 10/2008 |

OTHER PUBLICATIONS

PCT International Search Report, PCT Application No. PCT/AU2008/001701, Dec. 12, 2008, 5 pages.
(Continued)

*Primary Examiner* — Dana Ross
*Assistant Examiner* — Hemant Mathew
(74) *Attorney, Agent, or Firm* — Fenwick & West LLP

(57) ABSTRACT

A stove top device (10) for making espresso coffee. The device (10) comprises a coffee grounds reservoir (22), a water reservoir (28) and a first conduit (36). The water reservoir (22) has a base and a volume defined by a recommended filling level. The first conduit (36) has a first end in fluid communication with the water reservoir (28) at a level above the base and below the recommended filling level and a second end in fluid communication with the coffee grounds reservoir (22). In use, heated water is only communicated from the water reservoir (28) to the coffee grounds reservoir (22) until the water level in the water reservoir (28) falls below the first end.

3 Claims, 10 Drawing Sheets

(51) Int. Cl.
*A47J 31/30* (2006.01)
*A47J 31/06* (2006.01)
*A47J 31/52* (2006.01)

(56) References Cited

U.S. PATENT DOCUMENTS

| | | | |
|---|---|---|---|
| 5,267,506 A * | 12/1993 | Cai | 99/280 |
| 5,699,718 A | 12/1997 | Yung et al. | |
| RE37,173 E * | 5/2001 | Jefferson et al. | 99/299 |
| 6,405,637 B1 * | 6/2002 | Cai | 99/293 |
| 2003/0051604 A1 * | 3/2003 | Torigai et al. | 99/279 |
| 2005/0132892 A1 * | 6/2005 | Hall | 99/279 |

OTHER PUBLICATIONS

European Extended Search Report, European Application No. 08851983.0, Jul. 30, 2014, 6 pages.

\* cited by examiner

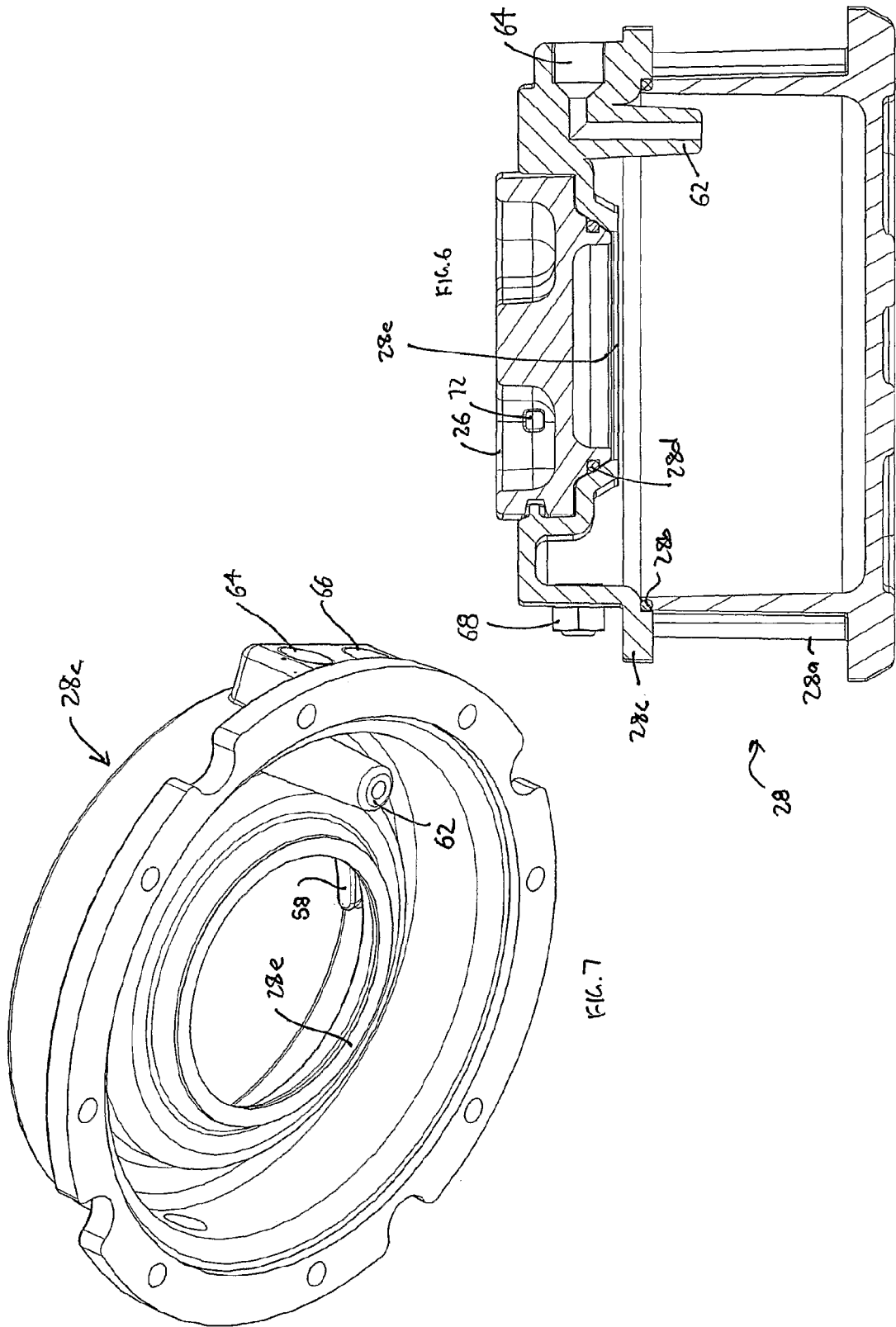

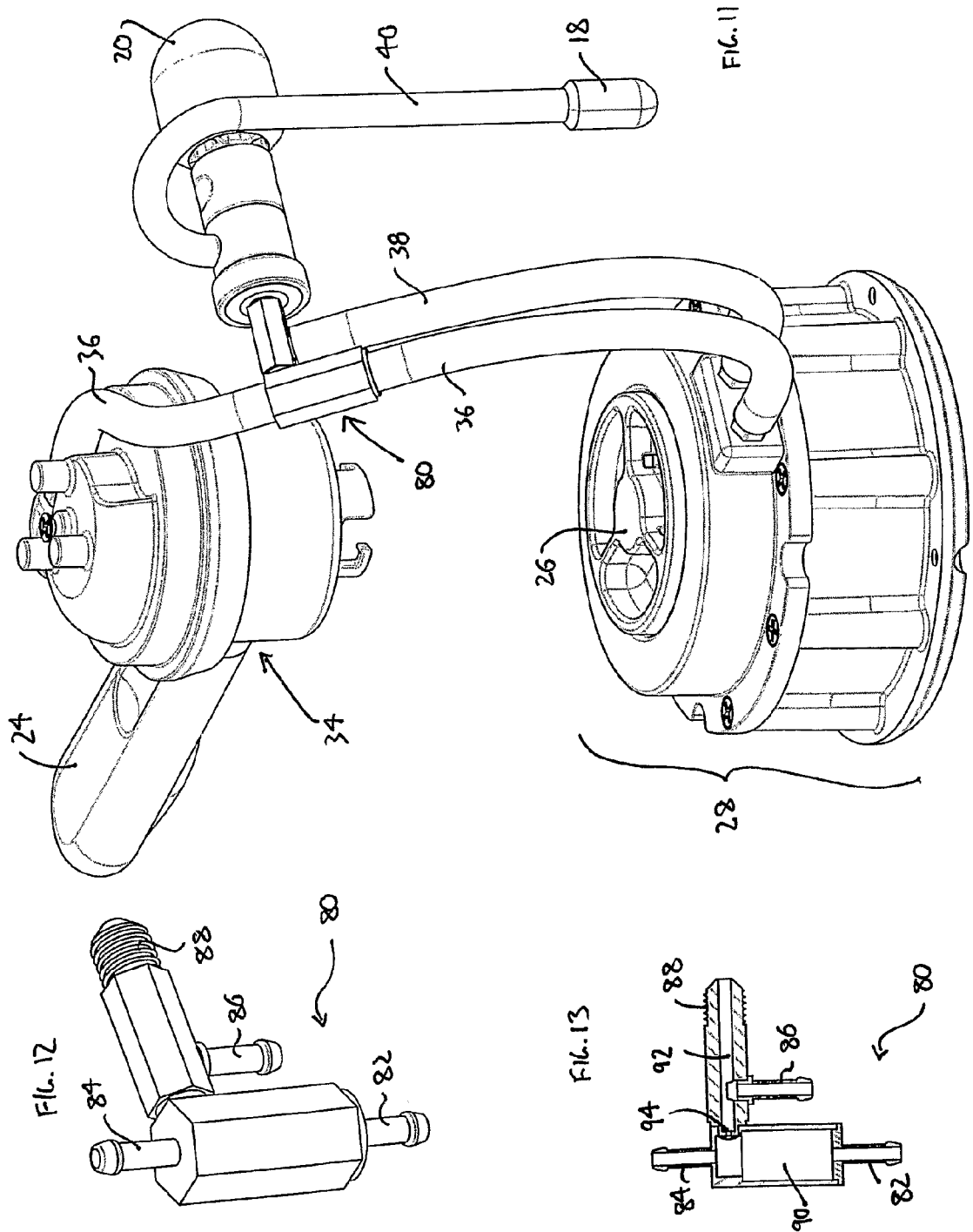

STOVE TOP DEVICE FOR MAKING ESPRESSO COFFEE

FIELD OF THE INVENTION

The present invention relates to a stove top device for making espresso coffee, such coffee having a brewed coffee component and, if required, a warmed or steamed milk component. More particularly, the device is able to make espresso coffees of the type including, but not limited to, short blacks, long blacks, flat whites, lattes, macchiatos and cappuccinos. The invention is suitable for use with stove tops that have, including but not limited to, gas burners, electric hotplates and induction hotplates.

BACKGROUND OF THE INVENTION

A stove top type espresso coffee machine marketed under the trademark ATOMIC is known. The ATOMIC espresso machine has a hollow unitary aluminium body with a lower water reservoir, an upper head for receiving a coffee grounds reservoir and a neck therebetween. The ATOMIC espresso machine also includes a cup which, when resting on the upper surface of the water reservoir, can receive the brewed coffee from the head. The ATOMIC espresso machine also includes a manually operable steam nozzle, in fluid communication with the interior of the body, for use in the warming and/or frothing of milk.

The ATOMIC espresso machine has several disadvantages. Firstly, the complex unitary body of the machine is difficult to access during assembly and repair processes and is produced by investment casting which is relatively expensive. Secondly, great precision must be taken in the manufacture of the unitary body, particularly with regards to maintaining wall thickness, as the entire body acts as a pressure vessel during use. The above issues result in the ATOMIC espresso machine being unsuitable for mass manufacture and largely handmade, which again adds to its expense.

Thirdly, if not carefully attended whilst in use, the ATOMIC espresso machine will continue to supply boiling water to the coffee grounds reservoir until the water reservoir has boiled dry. Fourthly, the ATOMIC does not regulate the supply of boiled water that reaches the coffee grounds reservoir. This makes producing consistent quality espresso coffee relatively difficult and can also lead to dilution and/or burning of the brewed coffee.

Fifthly, the head of the ATOMIC espresso machine has a female bayonet style fitting for connection with a male bayonet fitting on the coffee grounds reservoir. The female fitting is welded to the body, which makes disassembly and/or repair extremely difficult and expensive.

Sixthly, the carry point of the ATOMIC, being the handle of the coffee grounds reservoir, is threaded to the head of the coffee grounds reservoir. Accordingly, it is not possible to carry the ATOMIC safely if the thread becomes loose.

OBJECT OF THE INVENTION

It is the object of the present invention to substantially overcome or at least ameliorate one or more of the above disadvantages.

SUMMARY OF THE INVENTION

Accordingly, in a first aspect, the present invention provides a stove top device for making espresso coffee, the device comprising:

a coffee grounds reservoir;
a water reservoir having a base and a volume defined by a recommended filling level; and
a first conduit having a first end in fluid communication with the water reservoir at a level above the base and below the recommended filling level and a second end in fluid communication with the coffee grounds reservoir;
wherein, in use, heated water is only communicated from the water reservoir to the coffee grounds reservoir until the water level in the water reservoir falls below the first end.

The device preferably also comprises a second conduit having a first end in fluid communication with the water reservoir above the recommended filling level and a second end in fluid communication with a steam nozzle.

The device preferably comprises a substantially hollow body having a lower part for connection to the water reservoir, an upper head for connection to the coffee grounds reservoir and a hollow neck therebetween, wherein the first and or second conduits are within the hollow neck.

The first conduit is preferably in fluid communication with the second conduit, via an orifice of smaller internal diameter than the internal diameters of the first and second conduits. The device preferably includes a steam separating chamber in the first conduit. The chamber is preferably of larger internal diameter than the internal diameter of the first conduit. The steam separating chamber is preferably in fluid communication with the second conduit, via the orifice.

In a second aspect, the present invention provides a stove top device for making espresso coffee, the device comprising:
a body;
a water reservoir releasably attachable to the body.

The water reservoir is preferably in the form of a pressure vessel. The water reservoir preferably has a lid which can be removed from the water reservoir without requiring disassembly of the water reservoir from the body.

The device preferably also comprises a coffee grounds reservoir releasably attachable to the body. More preferably, the water reservoir is releasably attachable to a lower part of the body and the coffee grounds reservoir is releasably attachable to an upper head of the body. The water reservoir is preferably substantially concealed by the lower part of the body.

The device preferably also comprises a first conduit within the body providing fluid communication between the water reservoir and the coffee grounds reservoir. The device preferably also comprises a steam nozzle mounted on the body and a second conduit within the body providing fluid communication between the water reservoir and the steam nozzle. The body preferably includes a hollow neck between the lower part and the upper head, and the first and/or second conduits are within the hollow neck.

In a third aspect, the present invention provides a stove top device for making espresso coffee, the device comprising:
a body;
a head assembly adapted for substantially sealing connection with a coffee grounds reservoir,
wherein the head assembly is releasably attachable to the body.

The device preferably also comprises a water reservoir releasably attachable to the body. More preferably, the water reservoir is releasably attachable to a lower part of the body and the head assembly is releasably attachable to an upper head of the body.

The device preferably also comprises a first conduit within the body providing fluid communication between the water reservoir and the head assembly.

In a fourth aspect, the present invention provides a stove top device for making espresso coffee, the device comprising:

a body;

a coffee grounds reservoir;

a water reservoir having a lid;

a carrier adapted to receive the coffee grounds reservoir therein, the carrier having a handle, a first engaging formation adapted to allow connection with the body and a second engaging formation adapted to allow connection with the lid of the water reservoir.

The first and second engaging formations are preferably on opposite ends of the carrier, most preferably upper and lower ends respectively. The first and second engaging formations are preferably of the bayonet type.

BRIEF DESCRIPTION OF THE DRAWINGS

A preferred embodiment of the present invention will now be described, by way of an example only, with reference to the accompanying drawings, wherein:

FIG. 6 is an assembled cross-sectional view of the water reservoir shown in FIG. 5;

FIG. 7 is a lower perspective view of an upper part of the water reservoir shown in FIG. 5;

FIG. 11 is a partial exploded perspective view of the device shown in FIG. 10;

FIG. 12 is a perspective view of a fitting used in the device shown in FIG. 10; and FIG. 13 is a cross sectional view of the fitting shown in FIG. 12.

DETAILED DESCRIPTION OF THE PREFERRED EMBODIMENTS

Figure 1:
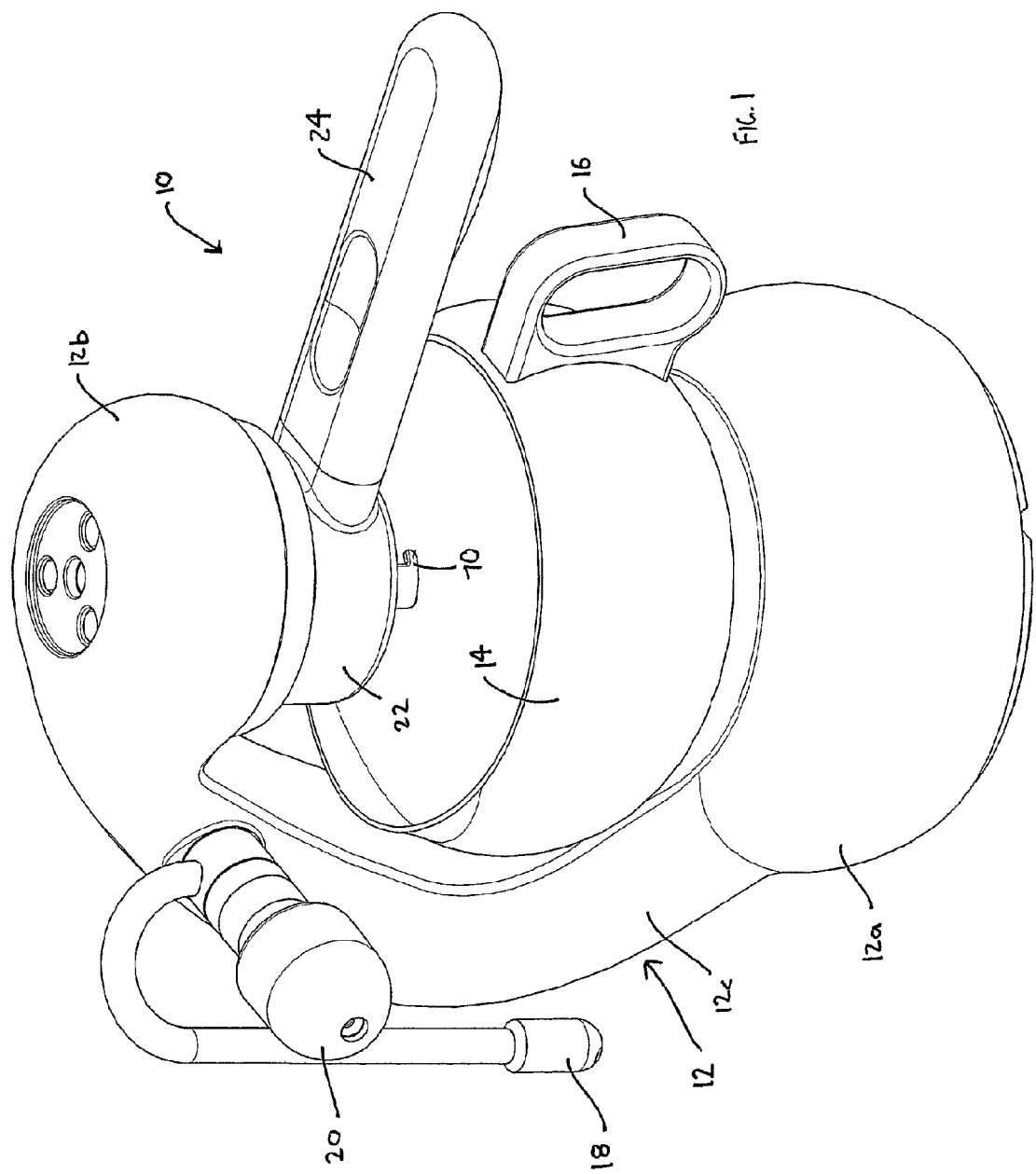
FIG. 1 is a perspective view of a first embodiment of a stove top device for making espresso coffee.

FIGS. 1 to 9 show a first embodiment of a stove top device 10 for making espresso coffee. As best seen in FIG. 1, the device 10 comprises a hollow stainless steel body 12 having a lower part 12a, an upper part or head 12b and a neck 12c therebetween. The hollow body 12 is produced by investment casting. A stainless steel jug 14 rests, in use, on the upper surface of the bottom part 12a. The jug 14 has an insulated nylon handle 16. The device 10 also has a steam nozzle 18 operated by rotation of an insulated nylon knob 20. Also shown in FIG. 1 is a stainless steel coffee ground reservoir carrier 22, which has an insulated nylon handle 24.

Figure 2:
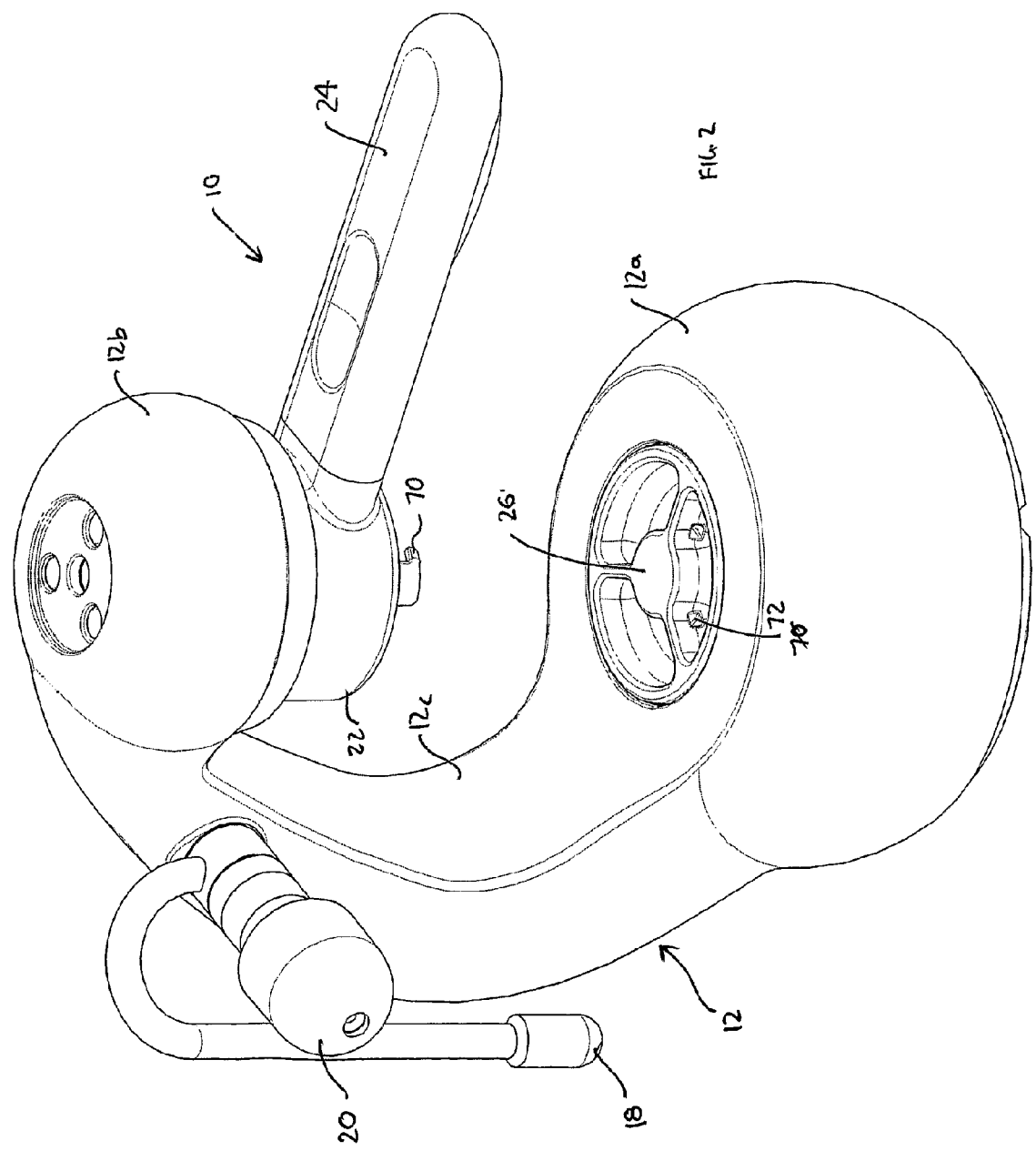
FIG. 2 is a perspective view of the device shown in FIG. 1 with the jug removed.

FIG. 2 shows the device 10 after the removal of the jug 14. This provides access to a lid 26 for a stainless steel water reservoir 28 that shall be described in more detail below.

Figure 3:
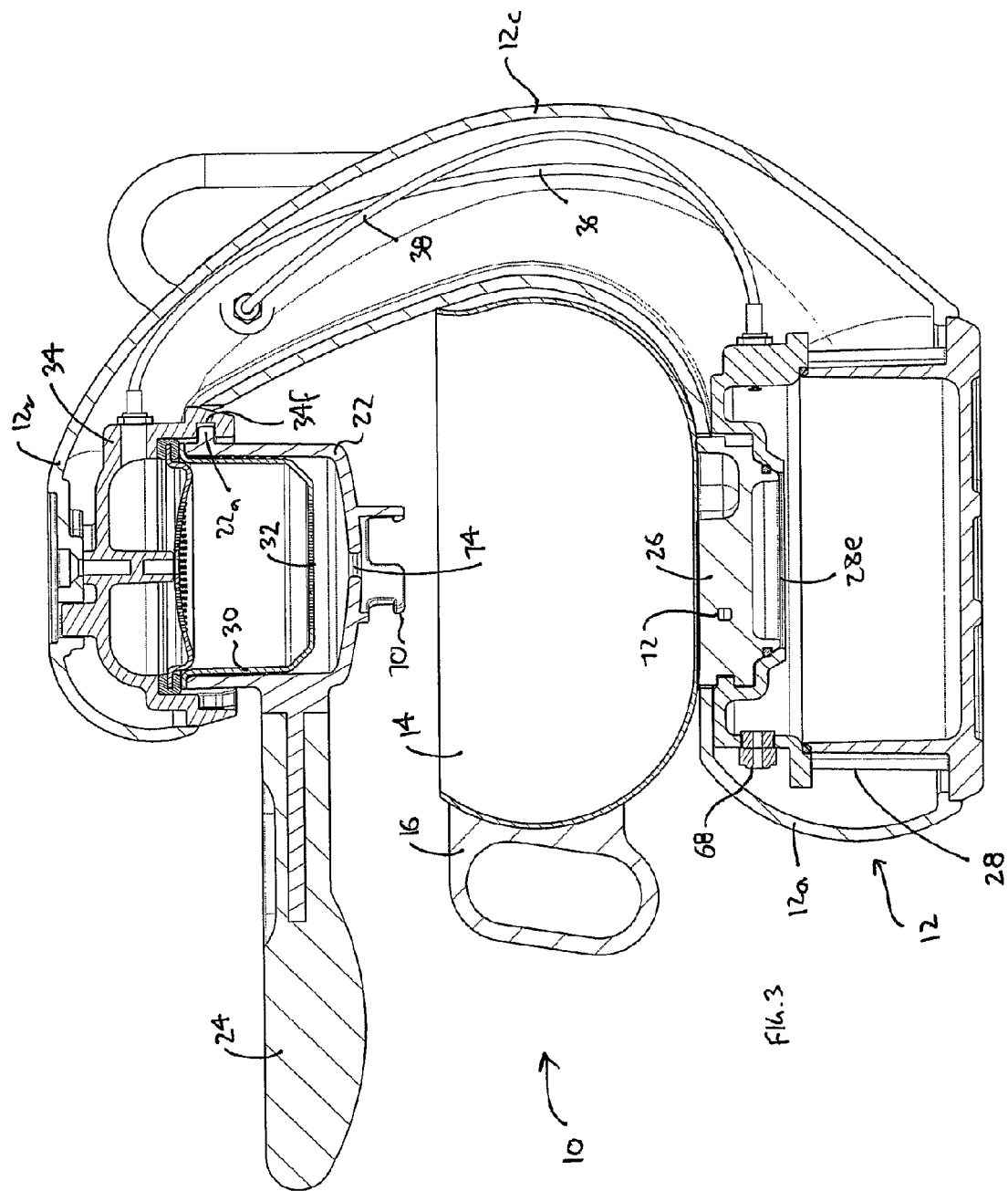
FIG. 3 is a cross-sectional side view of the device shown in FIG. 1.

FIG. 3 shows the water reservoir 28 mentioned above. FIG. 3 also shows a stainless steel coffee grounds basket or reservoir 30. The coffee grounds reservoir 30 is cup-shaped and has a number of perforations 32 in its base. FIG. 3 also shows a head assembly 34 to which is connected the carrier 22 in order to locate the coffee grounds reservoir 30. Also shown in FIG. 3 is a first teflon conduit 36 which connects the interior of the water reservoir 28 to the head assembly 34 and a second teflon conduit 38 which connects the interior of the water reservoir 28 to the steam nozzle 18.

Figure 4:
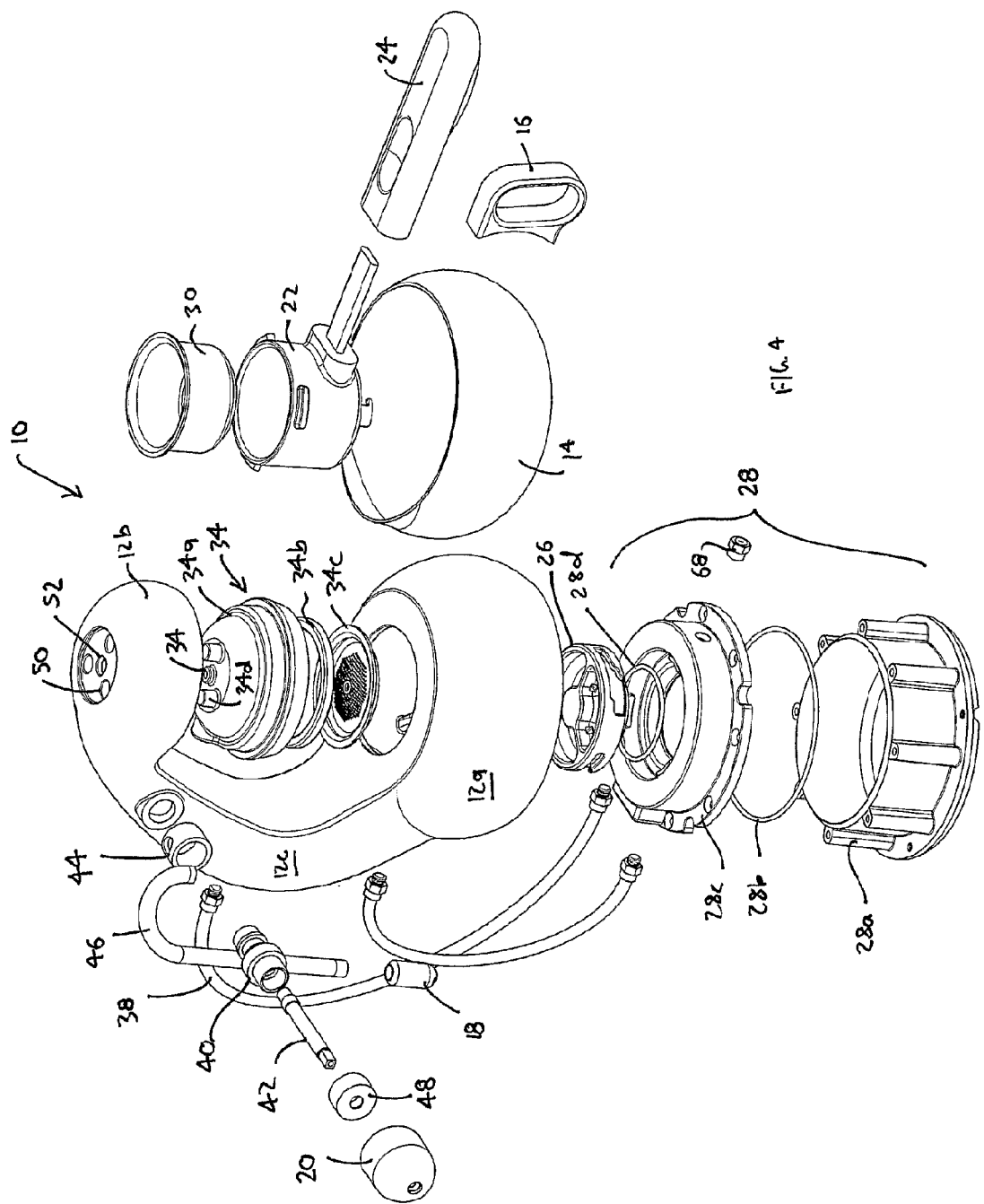
FIG. 4 is an exploded perspective view of the device shown in FIG. 1.

A more detailed description of the above components shall now be given with reference to FIG. 4. The steam nozzle 18 is connected to a valve 40 which is in turn connected to the knob 20 by a spindle 42. A hollow fitting 44 is positioned between the valve 40 and the neck 12c of the body 12. The fitting 44 is connected to a J-shaped tube 46 which is in turn connected to the nozzle 18. A washer 48 is positioned on the spindle 42 between the valve 40 and the knob 20.

FIG. 4 also shows that the head assembly 34 is comprised of an upper part 34a, a rubber seal 34b and a perforated filter screen 34c. The upper part 34a contains three spigots 34d which locate within corresponding openings 50 in the head 12b of the body 12. A screw (not shown) passes through a further opening 52 into a bore 34e to fix the head assembly 34 to the head 12b of the body 12. The head assembly 34 also includes female engaging bayonet-style formations 34f, which engage male bayonet-style engaging formations 22a on the carrier 22.

FIG. 4 also shows that the water reservoir 28 is formed from a lower part 28a, a first rubber seal 28b and an upper part 28c. The upper part 28c also includes a second seal 28d which locates against the lid 26.

Figure 5:
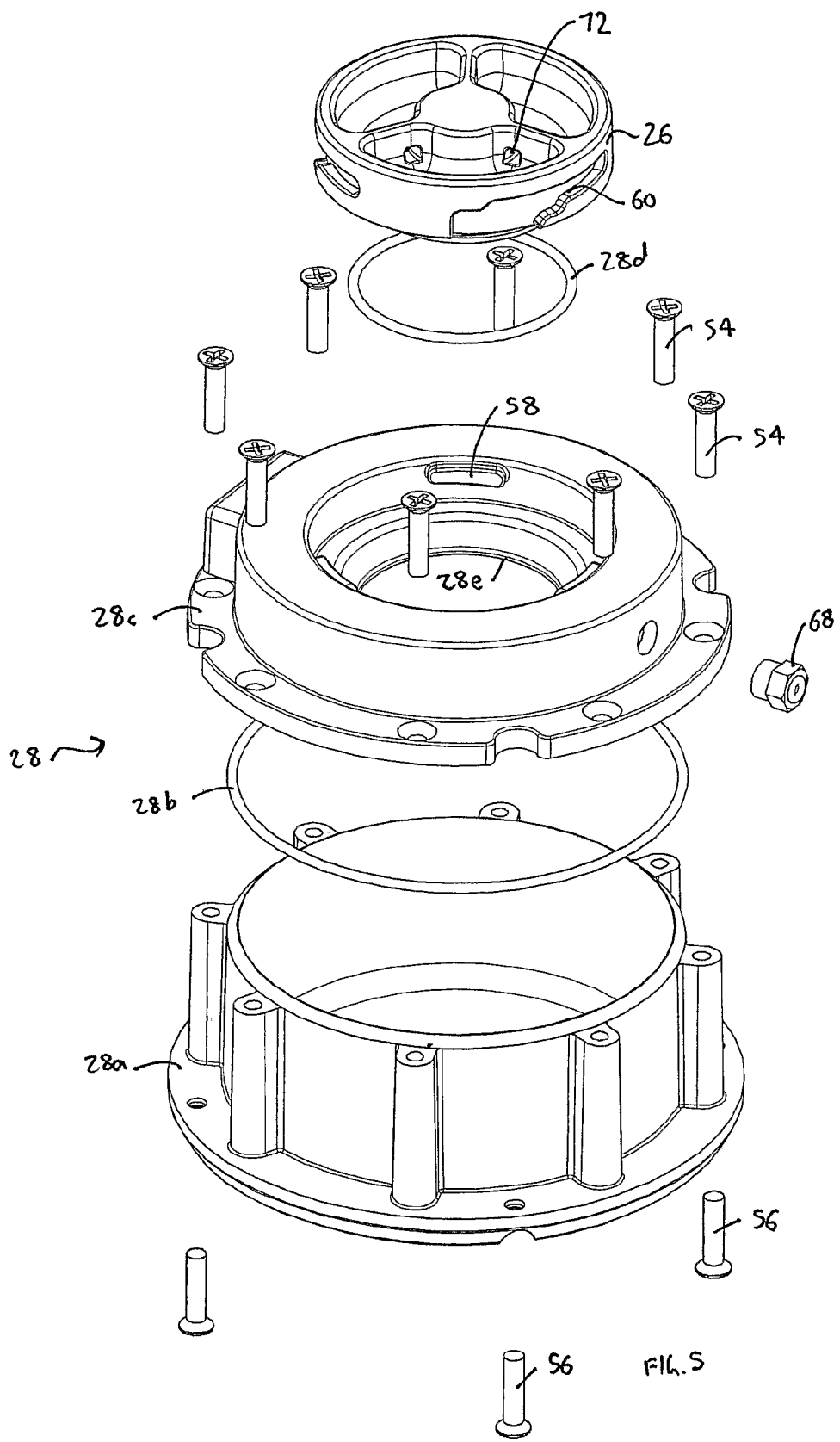
FIG. 5 is an exploded perspective view of a water reservoir of the device shown in FIG. 1.
Figure 8:
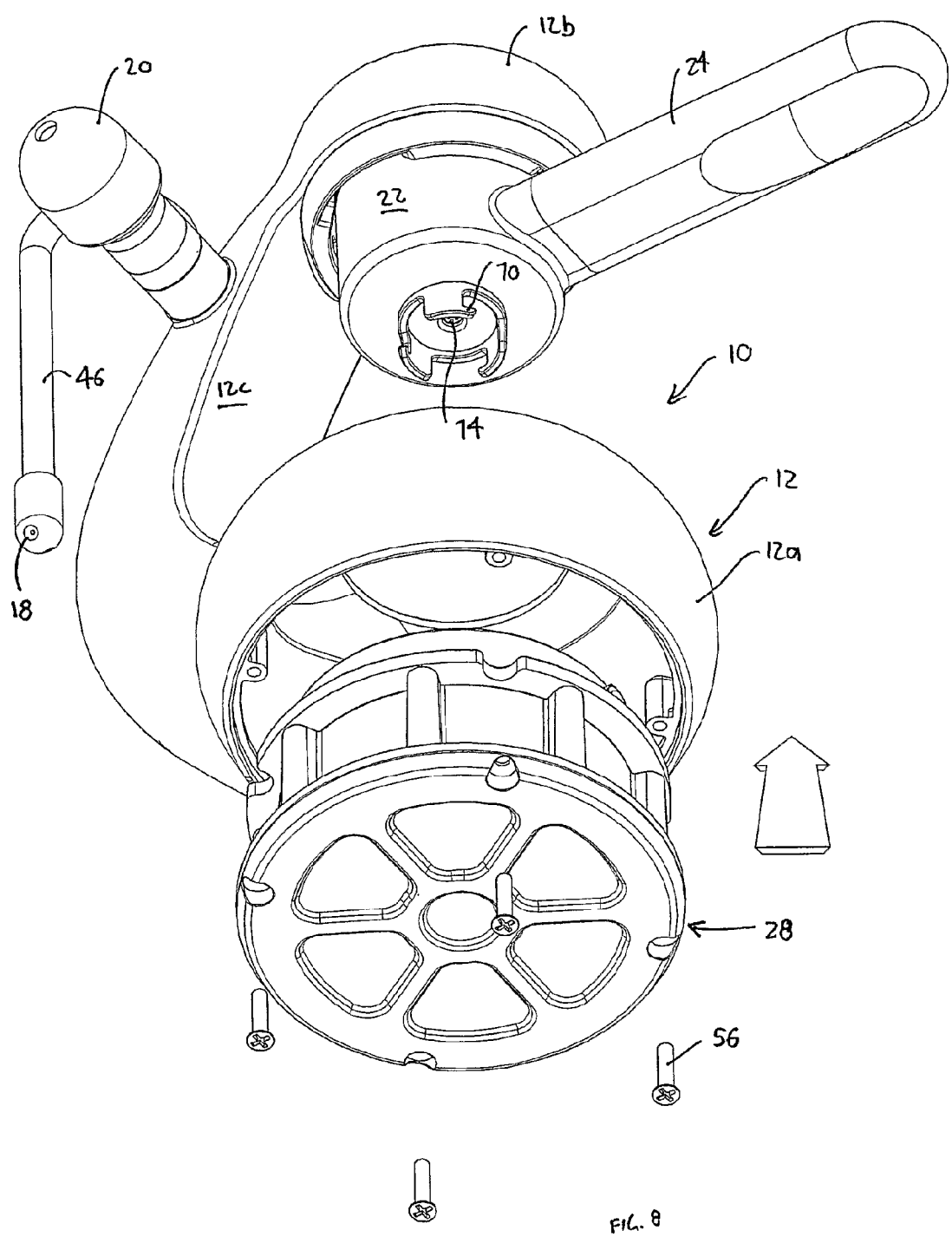
FIG. 8 is a lower perspective view of the device shown in FIG. 1 demonstrating assembly of the water reservoir with the body.
Figure 9:
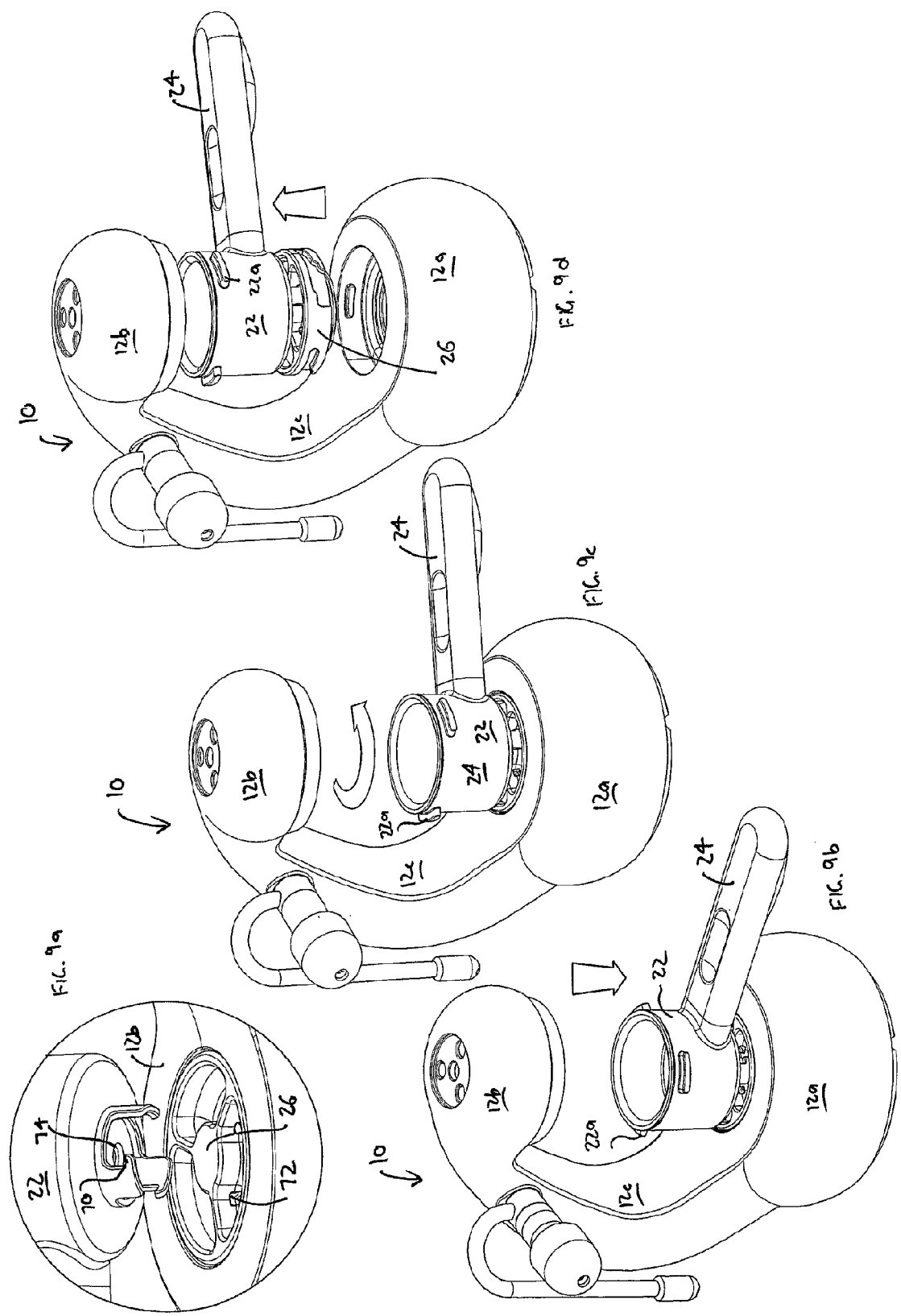
FIGS. 9a to 9d are sequential perspective views of the device shown in FIG. 1 demonstrating removal of the water reservoir lid.
Figure 10:
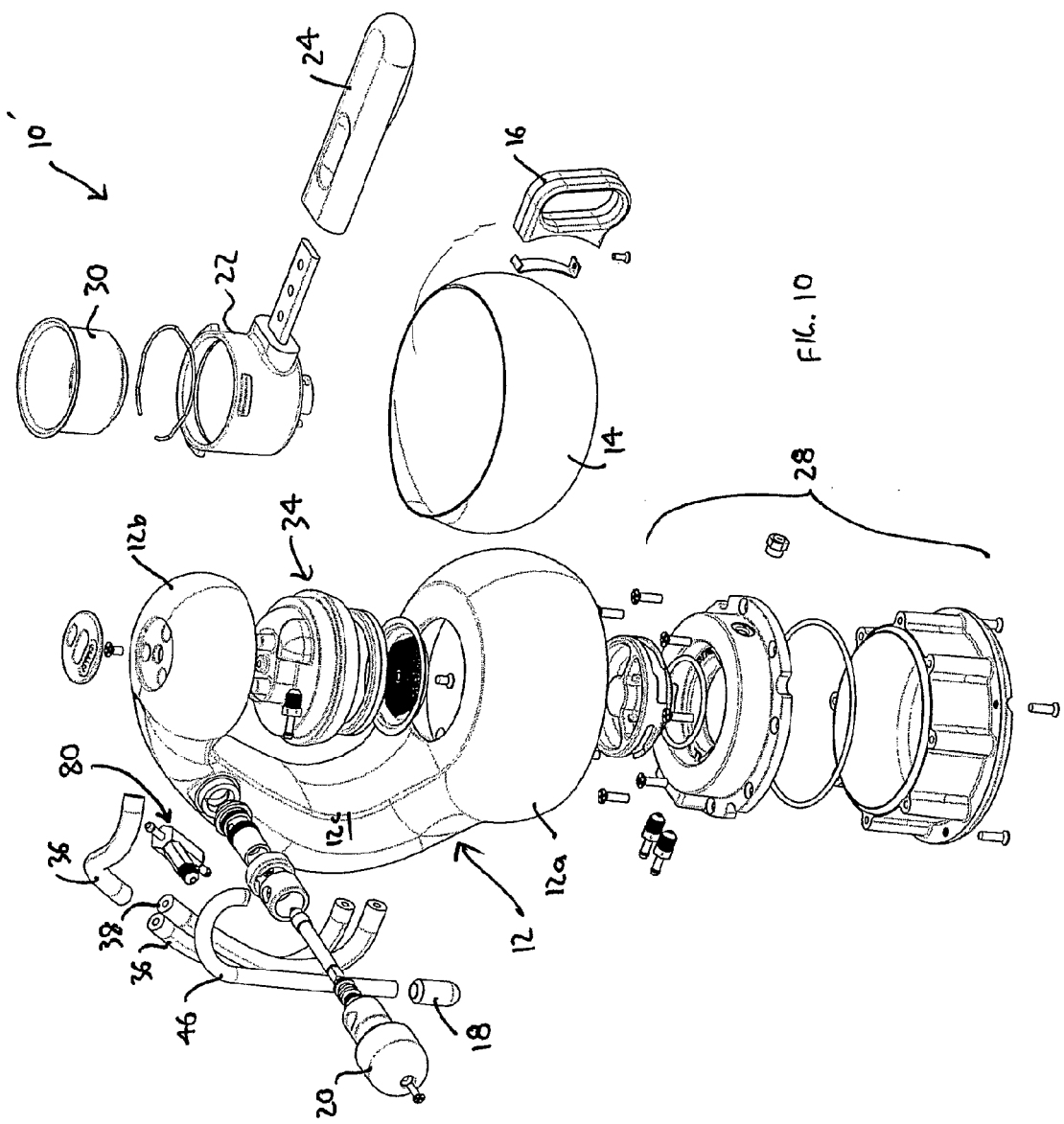
FIG. 10 is an exploded perspective view of a second embodiment of a stove top device for making espresso coffee.

As best shown in FIG. 5, the lower and upper parts 28a and 28b are connected by screws 54. As best shown in FIG. 8, the (assembled) water reservoir 28 is fixed within the lower part 12a of the body 12 by screws 56. FIG. 5 also shows the inwardly facing bayonet formations 58 on the part 28b which engage with the outwardly facing bayonet formations 60 provided on the lid 26.

With reference to FIGS. 6 and 7, it can be seen that the upper part 28c of the water reservoir 28 includes a downwardly depending inlet pipe 62 which is connected at bore 64 to the first conduit 36. The upper part 28c also includes a second bore 66 which is connected to the second conduit 38. The upper part 28c has a central opening 28e which in use defines a maximum (and recommended) water filling level for the reservoir 28. The bore 66 is in fluid communication for the interior of the water reservoir 28 at a higher level than the control opening 28e, which defines the filling level of the water reservoir 28. The water reservoir 28 also includes a pressure relief valve 68. As best seen in FIG. 8, the underside of the carrier 22 includes a male bayonet style engaging formations 70 which are adapted to engage with the female formations 72 formed in exposed surface of the lid 26. The carrier 22 also includes a central brewed coffee outlet 74 within the engaging formation.

The operation of the device 10 shall now be described with reference to FIGS. 9a to 9d. As shown in these drawings, the formations 70 on the underside of the carrier 22 can be engaged with the formations 72 on the exposed surface of the lid 26 and thereafter twisted to enable the lid 26 to be removed from the water reservoir 28. The water reservoir 28 can then be filled with water to a maximum volume established by the perimeter of the opening 28e. The lid 26 is then replaced by a reverse procedure to that shown in FIGS. 9a to 9d.

The coffee grounds reservoir 30 is then filled with coffee grounds suitably tamped to about 5 kg of pressure, placed in the carrier 22 and then locked in the position shown in FIGS. 1 and 3 by relative rotation between the carrier 22 and the head 12c of the device 10. After ensuring that the knob 20 has been sufficiently rotated to close the valve 40 for the steamer nozzle 18, the device 10 can be placed on the heating element of a stove top. As the water within the water reservoir 28 boils, it is forced through the pipe 62 into the conduit 36, into the head assembly 34, through the coffee grounds reservoir 30 and out of the outlet 79 and into the jug 14.

As the inlet to the pipe 62 is located above the bottom of the water reservoir 28 and below the (maximum) recommended filling level, the passage of water through the coffee grounds will stop when the water level has fallen to below the level of the inlet to the pipe 62. In the embodiment shown, the volume between the maximum filling height and the inlet to the pipe 56 is approximately 60 ml which is sufficient to make two cups of coffee of single strength or one cup of double strength (i.e. double shot) coffee.

During or shortly after the coffee brewing process, the knob 20 can be rotated to open the valve 40. This allows steam to travel from the above the water in the water reservoir 28 through the conduit 38 and so to the nozzle 18 for steaming milk. The milk is then added to the brewed coffee, as required.

The device 10 has many advantages over the known ATOMIC machine. Firstly, if the device 10 is left unattended on a heat source then, after supplying about 80 ml of water to the coffee grounds, it will not continue to force water through the coffee grounds. This avoids dilution and/or the addition of burned coffee to the correct quantity of the brewed coffee.

Secondly, the volume of the water reservoir 28 is less than that of the lower part of the body in the ATOMIC machine. As a result, the reduced volume of water in the water reservoir 28 is heated more quickly than the larger equivalent volume of water in the ATOMIC machine, which advantageously reduces both the time needed to operate the device 10 and energy consumption.

Another advantage of the device 10 is that the separate components of the water reservoir 28 and the head assembly 34 make the device 10 suitable for economical mass manufacture and easier to repair. In particular, the construction of the body 12 of the device 10 can be made less expensively because the base of the moulding is open, which simplifies the casting process. This also allows access for the assembly of the remaining parts of the device 10, as the body 12 does not act as a pressure vessel. This construction also allows the external casting to have a thinner wall section, which reduced the amount of raw material required. Only the water reservoir 28 needs to be constructed in accordance with the standards required for pressure vessels. A related advantage is that the water reservoir 28 is easily removable from the body 12 for cleaning and/or servicing simply by removing the screws 46. The head unit 34 is similarly also separately manufactured and easily removable from the body 12 for repair or service. This also allows the head assembly 34 to be manufactured with sufficient precision to ensure correct operation and sealing with the coffee grounds reservoir 22, without impacting adversely on the overall production cost of the body 12.

The shape of the steamer arm knob 20 of the device 10 is also more ergonomic than that of the ATOMIC, which allows a user to more easily apply torque the steamer knob.

The handle 16 on the jug 14 is also more ergonomic than that of the ATOMIC and allows a user's fingers to be comfortably positioned for carrying the jug 14.

A pouring lip section 14a of the jug 14 is also of improved design over the ATOMIC and provides for smoother and more accurate pouring of coffee.

Also, as the coffee grounds reservoir carrier 22 and the handle 24 are integrally formed, there is no risk that the handle 24 can become dislodged from the carrier 22 during use.

FIGS. 10 to 13 show a second embodiment of a stove top device 10' for making espresso coffee. The device 10' is similar to the device 10 shown in FIGS. 1 to 9 and like features are indicated with like reference numerals. However, as best seen in FIG. 11, the device 10' includes a manifold 80 connected to the first and second conduits 36 and 38 respectively. As previously stated, the first conduit 36 connects the water reservoir 28 to the head assembly 34 and the second conduit 38 connects the water reservoir 28 to the steam nozzle.

As best seen in FIGS. 12 and 13 the manifold 80 has three hollow barbed connectors 82, 84 and 86 and one hollow threaded connector 88. The connector 82 is connected to the part of the conduit 36 connected to the water reservoir 28. The connector 84 is connected to the part of the conduit 36 connected to the head assembly 34. Both of the connectors 82 and 84 are in fluid communication with a chamber 90. The connector 86 is connected to the end of the conduit 38 adjacent the steam valve 40. The connector 88 is connected to the inlet of the steam valve 40. The connectors 86 and 88 are in fluid communication with one another via a duct 92. The chamber 90 and the duct 92 are also in fluid communication with one another, via an orifice 94.

The device 10' operates in a similar manner as that previously described with reference to the device 10. However, during heating of the water in the water reservoir 28, but prior to boiling, the orifice 94 provides a bleed path for the expanding air and vapour in the water reservoir 28 (above the water level) to escape. This prevents water being forced up the conduit 36 and delivered to the head assembly 34 before reaching a rolling boil, which would be undesirable as it causes the coffee to be extracted at an incorrect temperature and produces an inferior result.

The manifold 80 thus permits the use of a low profile separate water reservoir 28, necessarily having a minimal steam space (defined as the volume in the interior of the water reservoir 28 above the maximum water-fill level). A low profile reservoir is preferably for aesthetic concerns, compactness and manufacturing.

The height of the top of the chamber 90 is approximately 100 mm above the level of the water in the water reservoir 28. This ensures a suitable steaming rate at which water is raised to the level of the manifold 80 by forcing the head loss of steam passing through the orifice 94 to exceed the stated height. From the manifold 80, the water is carried over as a water and steam mixture to the head assembly 34. The presence of steam in the conduit 36 above the manifold 80 also advantageously assists to maintain the water temperature. In the embodiment shown, the diameter of the orifice is approximately 1.0 mm. The diameter of the orifice 94 can be also adjusted in order to adjust the carryover steaming rate.

The manifold 80 also prevents potential degradation of performance if the water level in the water reservoir 28 is too high, or foaming occurs in the water reservoir 28 or if vigorous turbulence within the boiling water causes water to enter the second conduit 38. In order to avoid this occurring, the chamber 90 acts as a steam separator which causes any slugs of water entering the second conduit 38, prior to the desired carryover steaming rate, to return to the water reservoir 28 via the first conduit 36.

Although the invention has been described with reference to preferred embodiments, it will be appreciated by persons skilled in the art of the invention may be embodied in many other forms.

The invention claimed is:

1. A stove top device for making espresso coffee, the device comprising:
   a coffee grounds reservoir;
   a water reservoir having a base and a volume defined by a recommended filling level, the base of the water reservoir configured to receive heat from a stove top and transmit the heat from the stovetop to the water reservoir;
   a first conduit having a first inner diameter and a first end in fluid communication with the water reservoir at a level above the base and below the recommended filling level and a second end in fluid communication with the coffee grounds reservoir;
   a second conduit having a second inner diameter and a first end in fluid communication with the water reservoir above the recommended filling level and a second end in fluid communication with a steam nozzle;
   an orifice having a third inner diameter smaller than the first inner diameter and the second inner diameter, and providing a channel for fluid communication between the first conduit and the second conduit, such that the steam nozzle is in fluid communication with the coffee grounds reservoir through the orifice;
   a substantially hollow body having a lower part for connection to the water reservoir, an upper head for connection to the coffee grounds reservoir and a hollow neck between the lower part and the upper head, the first and second conduits are within the hollow neck;
   a steam separating chamber in the first conduit; and
   wherein, in use, heat from the stove top is transferred into water in the water reservoir and the heated water is only communicated from the water reservoir to the coffee grounds reservoir until a water level of the water in the water reservoir falls below the first end of the first conduit, the water level remaining above the base of the water reservoir, and the heated water generates steam that is communicated from the second conduit to the steam nozzle.

2. The device as claimed in claim 1, wherein the steam separating chamber has a fourth inner diameter, the fourth inner diameter being larger than the first inner diameter.

3. The device as claimed in claim 2, wherein the steam separating chamber is in fluid communication with the second conduit via the orifice.

\* \* \* \* \*